UNITED STATES PATENT OFFICE.

CHARLES E. PERRY AND LOUIS BOSSING, OF MARION, AND CHARLES A. FARMER, OF COLUMBUS, OHIO.

COMPOSITION FOR COATING MEAT.

No. 846,861.     Specification of Letters Patent.     Patented March 12, 1907.

Application filed March 16, 1906. Serial No. 306,395.

*To all whom it may concern:*

Be it known that we, CHARLES E. PERRY and LOUIS BOSSING, residing at Marion, in the county of Marion and State of Ohio, and CHARLES A. FARMER, residing at Columbus, in the county of Franklin and State of Ohio, citizens of the United States, have invented certain new and useful Improvements in Meat-Protecting Compositions, of which the following is a specification.

Our invention relates to protective compounds for coating meats, and has for its object the provision of a preparation that will effectually protect such commodities from mold and the inroads of insects.

Our protective compound consists of the following ingredients, mixed in the manner stated and applied as described, viz: pure cider vinegar, one gallon; cayenne pepper, six ounces; fine salt, four ounces; oil of cinnamon, one dram; oil of allspice, one dram.

The pepper, salt, and oils of cinnamon and allspice are stirred into the vinegar, and then the composition is subjected to the action of heat until it comes to a boil, when it will become a thoroughly-saturated solution. The preparation is then ready for application to cured meats and is applied by coating the meat with the compound, applying it with a brush, cloth, &c., or by dipping it therein, it being necessary simply to cover the surface of the meat with the preparation to protect it from mold and the inroads of insects, including skippers.

We are aware that a composition has heretofore been in use for the purpose of pickling fish being immersed therein and in some cases also inclosed in air-tight receptacles, while our preparation has been so perfected that by simply coating the meat with it it effectually protects the meat from mold and skippers, as hereinbefore stated, and with its use the meat retains its flavor as well.

Having thus described our invention, what we claim is—

A composition for coating meats, comprising the following ingredients and in the proportions stated, viz: pure cider vinegar, one gallon; cayenne pepper, six ounces; fine salt, four ounces; oil of cinnamon, one dram; and oil of allspice, one dram; substantially as described.

In testimony whereof we hereto affix our signatures in the presence of two witnesses.

CHARLES E. PERRY.
    LOUIS BOSSING.
    CHARLES A. FARMER.

Witnesses:
    J. H. EYMON,
    EDWARD T. EVERETT.